United States Patent Office 3,548,014
Patented Dec. 15, 1970

3,548,014
PROCESS FOR REDUCING THE 2-CHLOROBUTA-DIENE-(1,3) AND BENZENE CONTENTS OF 1,2-DICHLOROETHANE RECOVERED FROM 1,2-DICHLORETHANE THERMALLY CRACKED INTO VINYL CHLORIDE
Armin Jacobowsky, Knapsack, near Cologne, Peter Wirtz, Cologne-Lindenthal, Klaus Born, Bad Soden, and Gerhard Rechmeier, Kierdorf, Germany, assignors to Knapsack Aktiengesellschaft, Knapsack, near Cologne, Germany, a corporation of Germany
No Drawing. Filed Aug. 19, 1968, Ser. No. 753,783
Claims priority, application Germany, Aug. 25, 1967, K 63,202
Int. Cl. C07c 19/00, 17/38
U.S. Cl. 260—652       5 Claims

ABSTRACT OF THE DISCLOSURE

Reduction of 2-chlorobutadiene-(1,3) and benzene contents of 1,2-dichloroethane, which is recovered from 1,2-dichloroethane subjected to thermal cracking into vinyl chloride, comprising heating dry, contaminated 1,2-dichloroethane in a closed vessel together with 0.01 to 0.5% by weight anhydrous aluminum chloride, at a temperature between 70 and 150° C. and for a preferred period of between 24 and 48 hours.

---

It has already been described in British Pat. 824,588 that chlorinated $C_1$- and $C_2$-hydrocarbons can be purified by heating them together with anhydrous ferric chloride to a temperature of at least 70° C. until hydrogen chloride and carbon dioxide cease to be evolved. However, this process cannot be used for reducing the 2-chlorobutadiene-(1,3) and benzene contents of contaminated 1,2-dichloroethane, which is recovered from 1,2-dichloroethane subjected to incomplete thermal cracking into vinyl chloride.

The present process for reducing the 2-chlorobutadiene-(1,3) and benzene contents of 1,2-dichloroethane, which is recovered from 1,2-dichloroethane subjected to thermal cracking into vinyl chloride, comprises more especially heating dry, contaminated 1,2-dichloroethane in a closed vessel together with 0.01 to 0.5% by weight, preferably 0.1 to 0.15% by weight, anhydrous aluminum chloride, at a temperature between 70 and 150° C., preferably between 130 and 150° C., and for a preferred period of time between 24 and 48 hours. A special mode of executing the present process comprises allowing hydrogen chloride, which is evolved during the heating step, to escape in gas form with relief of pressure, neutralizing the 1,2-dichloroethane by the introduction of ammonia, and distilling it.

In those cases in which 1,2-dichloroethane is subjected to incomplete thermal cracking with the resultant formation of vinyl chloride and hydrogen chloride, the unreacted 1,2-dichloroethane (B.P.=83° C.) is distilled off together with low-boiling fractions (B.P.=<83° C.) (referred to hereinafter as low boilers) and high-boiling fractions (B.P.=>83° C.) (referred to hereinafter as high boilers). Following the isolation of the low boilers, which is accompanied by strong losses of material, the 1,2-dichloroethane is returned to the cracking furnace. As compared therewith, it has been suggested in German published specification 1,242,594 that 1,2-dichloroethane and low boilers be returned jointly to the cracking furnace to transform the low boilers into high boilers, which are relatively easy to separate later by distillation. The low boilers substantially include benzene, 2-chlorobutadiene-(1,3), 1,1-dichloroethane, 1,1-dichloroethylene, chloroform, methylchloroform, ethyl chloride and carbon tetrachloride.

The isolation of benzene and 2-chlorobutadiene-(1,3) in a technically simple process is of considerable interest in either of the two cases referred to above, for the following reasons:

(1) The complete distillative isolation of the low boilers from 1,2-dichloroethane results in the concentration of 2-chlorobutadiene-(1,3) near the head of the low boiler treatment column. Given too high a 2-chlorobutadiene-(1,3) concentration, polymerization phenomena are then found to occur in the column and its associated condensation system. In order to avoid this, head product formed in the low boiler column is removed in quantities which ensure that the maximum 2-chlorobutadiene-(1,3) concentration does not exceed 5 to 10%, the head product withdrawn being subjected to combustion as usual. However, this entails losses in 1,2-dichloroethane which can be 10 times as high as the quantity of 2-chlorobutadiene-(1,3) produced. In the present process, the benzene and 2-chlorobutadiene-(1,3) coming from the low boiler column are transformed into high boilers, which are returned to the column. Further low boilers can be concentrated up to substantially 100% and removed later, without any loss of 1,2-dichloroethane.

(2) As already mentioned above, in the process with complete low boiler recycle to the furnace feed material, it is not necessary to remove low boilers, which are transformed into high boilers in the (cracking furnace) coil. However, merely a portion of the low boilers undergo quantitative transformation, whereas further portions are less completely transformed. The result is the formation of an equilibrium concentration.

As a result of its aromatic nature, the benzene formed during the cracking step undergoes but a very slight secondary reaction. Chlorobenzene has in fact been found to appear in the base of the high boilers concentration zone. However, this compound, which derives from the above secondary reaction, is produced at very low rates which make the benzene level increase continuously in the 1,2-dichloroethane cycle and forbid awaiting the formation of equilibrium concentration bearing in mind that the cracking temperature increases as the benzene content increases, which is undesirable. For this reason, it is necessary to remove all of the cycled 1,2-dichloroethane at intervals comprising several months, and replace it by 1,2-dichloroethane free from benzene.

The present process, wherein the cycled 1,2-dichloroethane is treated with catalytic amounts of anhydrous aluminum chloride, enables the benzene content to be maintained at a constant value, for example of 2% by weight, and also enables the equilibrium concentration of 2-chlorobutadiene-(1,3) to be substantially reduced.

The low boiler-containing 1,2-dichloroethane is delivered to a heatable container and dried therein, with agitation, by the addition of phosphorus pentoxide, given a water content higher than 40 parts per million (p.p.m.). Aluminum chloride is added later in a proportion between 100 and 5000 p.p.m., preferably between 1000 and 1500 p.p.m. The container is heated from the outside to produce a temperature of 70–150° C., preferably 130–150° C., and to establish a pressure between 0 and 7 atmospheres gauge. After a sojourn time of 24 to 48 hours, preferably 36 hours, the hydrogen chloride split off is evacuated by scrubbing the issuing gas by means of an alkaline sodium hydroxide solution. The 1,2-dichloroethane so treated is neutralized by the introduction of ammonia. 90 to 95% of the 2-chlorobutadiene-(1,3) initially present and about 20 to 30% of the benzene initially present will be found to have been transformed into high boilers, after that treatment. The whole is repumped then to the 1,2-dichloroethane distillation column.

The particular process used for cracking 1,2-dichloroethane dominates the removal of low boiler-containing 1,2-dichloroethane at various places of the cracking installation.

(1) Two functions are assigned to the column in the process with complete low boiler separation, namely dehydration and simultaneous isolation of the low boilers. Practical requirements call for this, namely the fact that 1,2-dichloroethane cracking installations are normally connected to a 1,2-dichloroethane production plant (additive combination of chlorine with ethylene) and often are further connected to an oxy-chlorination plant, in which the hydrogen chloride evolved on cracking is re-transformed into 1,2-dichloroethane, by treatment with ethylene and air. Both freshly produced 1,2-dichloroethane and recovered crack 1,2-dichloroethane are worked up in a common distilling apparatus. The column again has two assigned functions, namely the dehydration of 1,2-dichloroethane and simultaneous removal of low boilers. In this process, the water is delivered as a second phase to a separator arranged downstream the condensation zone. For this reason, the water-saturated, low boiler-containing 1,2-dichloroethane should conveniently not be withdrawn from head product obtained in the low boiler column, but fairly anhydrous, low boiler-containing 1,2-dichloroethane should be evacuated instead from a secondary stream emerging through a lateral offtake of the low boiler column or dehydration column. The secondary stream should preferably emerge through an offtake near a tray in the column, where the 1,2-dichloroethane contains a fairly low amount of water plus 2-chlorobutadiene-(1,3) and benzene, each of these two latter compounds in a proportion between 1 and 8%, preferably between 2 and 5.5%.

(2) In those cases, however, in which the distillation of cracked 1,2-dichloroethane recovered from the cracking zone is not simultaneously coupled with that of 1,2-dichloroethane freshly produced by chlorination or oxychlorination, and in which the separation of low boilers from the cracked 1,2-dichloroethane recovered from the cracking zone is omitted, the low boilers contained in the 1,2-dichloroethane are returned, once the high boilers have been isolated, to the cracking furnace. In that furnace, the low boilers are transformed into high boilers, i.e. 2-chlorobutadiene-(1,3) to a greater extent and benzene to a lesser extent. Here again, it has proved advantageous to use the present process, which enables the values of the equilibrium concentration of benzene and 2-chlorobutadiene-(1,3) to be lowered and maintained constant. In this event, the low boiler-containing 1,2-dichloroethane can be evacuated by two different ways.

(a) In the high boiler-separation column, the bulk of 1,2-dichloroethane is subjected to partial condensation and removed through a lateral offtake. The offtake is arranged at a column height which ensures that the product has the desired purity, relative to high boilers. In the column head, the low boilers, which are completely condensed and completely refluxed, are concentrated so as to contain 2-chlorobutadiene-(1,3) and benzene, each of these two compounds in a concentration between 1 and 8%, preferably between 2 and 5.5%, which is desirable. The product so obtained is treated with aluminum chloride and returned later to the base of the high boiler-separation column.

(b) Distillate coming from the high boiler-separation column is introduced into a second column, termed degassing column, and extracted by boiling. About 10% of the 1,2-dichloroethane introduced is vaporised. Pure 1,2-dichloroethane with a reduced content of low boilers is withdrawn from the column base. All of the vapors which arrive in the column head are condensed out and refluxed. Certain quantities of reflux matter are taken from the reflux container, treated with aluminum chloride and returned to the base of the high boiler-separation zone.

EXAMPLE 1

Low boiler-containing 1,2-dichloroethane containing less than 10 p.p.m. water and composed of 0.48% by weight ethyl chloride, 0.12% by weight vinylidene chloride, 1.6% by weight 2-chlorobutadiene-(1,3), 1.8% by weight 1,1 - dichloroethane, 0.88% by weight carbon tetrachloride and methyl chloroform, 5.1% by weight benzene, 0.46% by weight chloroform and 89.2% by weight, 1,2 - dichloroethane, was mixed with agitation, in a heatable container, with 0.15% by weight anhydrous aluminum chloride. By external heating, the mixture was brought to a temperature of 150° C. and a pressure of 6 atmospheres gauge was found to establish. The container was cooled after 36 hours, the hydrogen chloride evolved was removed by scrubbing the issuing gas with an alkaline sodium hydroxide solution and the 1,2-dichloroethane was neutralized by the introduction of gaseous ammonia, and distilled. In addition to 2.5% of a high-boiling residue, there were recovered 97% of the feed material in the form of a distillate composed of 0.0% by weight ethyl chloride, 0.12% by weight vinylidene chloride, 0.08% by weight 2-chlorobutadiene-(1,3), 1.9% by weight 1,1-dichloroethane, 0.9% by weight carbon tetrachloride and methyl chloroform, 4.2% by weight benzene, 0.46% by weight chloroform and 92.4% by weight 1,2-dichloroethane.

Result: 85% of the 2-cholorbutadiene-(1,3), and 20% of the benzene initially present were found to have been transformed. Vaporization which occurred on pressure relief was found to reduce the ethyl chloride proportion initially present.

EXAMPLE 2

A mixture containing more 2 - chlorobutaidene-(1,3) and less benzene than that used in Example 1 was treated under the conditions described in the preceding example: the water content was 30 p.p.m.

| Composition of mixture | Before reaction (percent by weight) | After reaction and distillation (percent by weight) |
|---|---|---|
| Ethyl chloride | 0.79 | 0.16 |
| Vinylidene chloride | 0.43 | 0.45 |
| 2-chlorobutadiene-(1, 3) | 8.0 | 0.12 |
| 1, 1-dichloroethane | 3.6 | 4.0 |
| Carbon tetrachloride and methyl chloroform | 0.94 | 1.0 |
| Benzene | 2.8 | 2.1 |
| Chloroform | 0.27 | 0.3 |
| 1, 2-dichloroethane | 84.0 | 92.4 |

Result: 99% of the 2-chlorobutadiene-(1,3) and 25% of the benzene initially present were found to have been transformed. The distillation of the feed material gave 9% high boilers and 91% of a distillate having the composition indicated above.

EXAMPLE 3

This example was carried out for 24 hours at 150° C. and a pressure of 6 atmospheres gauge while adding again 0.15% by weight anhydrous aluminum chloride. The feed mixture contained 20 p.p.m. water.

| Composition of mixture | Before reaction (percent by weight) | After reaction and distillation (percent by weight) |
|---|---|---|
| Ethyl chloride | 1.4 | 0.14 |
| Vinylidene chloride | 0.09 | 0.1 |
| 2-chlorobutadiene-(1,3) | 2.9 | 0.15 |
| 1,1-dichloroethane | 4.1 | 4.3 |
| Carbon tetrachloride | 0.8 | 0.8 |
| Benzene | 3.6 | 3.9 |
| Chloroform | 0.32 | 0.34 |
| 1,2-dichloroethane | 85.2 | 91.0 |

Result: 95% of the 2-chlorobutadiene-(1,3) and 23% of the benzene initially present were found to have been transformed into high boilers. The distillation of the feed mixture gave 5% high boilers and 95% of a distillate having the composition indicated above.

EXAMPLE 4

The reaction temperature was lowered to 83° C. (boiling temperature of 1,2 - dichloroethane); this corresponded to carrying out the reaction at atmospheric pressure with reflux. It was necessary to increase the sojourn time to 48 hours in order to obtain the conversion rates described in the preceding examples. 0.1% by weight $AlCl_3$ was added and the following result was obtained:

| Composition of mixture | Before reaction (percent by weight) | After reaction and distillation (percent by weight) |
|---|---|---|
| Ethyl chloride | 0.74 | 0.007 |
| Vinylidene chloride | 0.28 | 0.016 |
| 2-chlorobutadiene-(1,3) | 2.9 | 0.43 |
| Carbon tetrachloride and 1, 1-dichloroethane | 2.5 | 2.0 |
| Benzene | 5.5 | 4.6 |
| Chloroform | 0.27 | 0.27 |
| 1,2-dichloroethane | 85.5 | 92.8 |

We claim:

1. A process for reducing the 2-chlorobutadiene-(1,3) and benzene contents of contaminated 1,2-dichloroethane, recovered from 1,2-dichloroethane which has been subjected to thermal cracking into vinyl chloride, which comprises heating the dry, contaminated 1,2-dichloroethane in a closed vessel together with 0.01 to 0.5% by weight anhydrous aluminum chloride, at a temperature between 70 and 150° C.

2. The process of claim 1, which further comprises evacuating gaseous hydrogen chloride, which is evolved during the heating step, by the release of pressure, neutralizing the 1,2-dichloroethane by the introduction of ammonia, and distilling said 1,2-dichloroethane.

3. The process of claim 1, which comprises heating the contaminated 1,2-dichloroethane together with 0.1 to 0.15% by weight anhydrous aluminum chloride.

4. The process of claim 1, which comprises carrying out the heating step at a temperature between 130 and 150° C.

5. The process of claim 1, which comprises carrying out the heating step for a period between 24 and 48 hours.

References Cited

UNITED STATES PATENTS

| | | | |
|---|---|---|---|
| 3,476,955 | 11/1969 | Krekeler et al. | 260—656 |
| 3,484,493 | 12/1969 | Krekeler et al. | 260—656 |

FOREIGN PATENTS

| | | | |
|---|---|---|---|
| 824,588 | 12/1959 | Great Britain | 260—652P |

HOWARD T. MARS, Primary Examiner

U.S. Cl. X.R.

260—656